US009990412B2

(12) United States Patent
Caufield et al.

(10) Patent No.: US 9,990,412 B2
(45) Date of Patent: Jun. 5, 2018

(54) DATA DRIVEN PARALLEL SORTING SYSTEM AND METHOD

(71) Applicant: International Business Machines Corporation, Armonk, NY (US)

(72) Inventors: Brian K. Caufield, Livermore, CA (US); Ron E. Liu, San Jose, CA (US); Dong J. Wei, Beijing (CN); Xin Ying Yang, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 455 days.

(21) Appl. No.: 14/263,138

(22) Filed: Apr. 28, 2014

(65) Prior Publication Data

US 2014/0324890 A1    Oct. 30, 2014

(30) Foreign Application Priority Data

Apr. 28, 2013  (CN) .......................... 2013 1 0154333

(51) Int. Cl.
*G06F 7/00* (2006.01)
*G06F 17/30* (2006.01)
(Continued)

(52) U.S. Cl.
CPC .......... *G06F 17/30584* (2013.01); *G06F 7/24* (2013.01); *G06F 7/36* (2013.01); *G06F 17/30486* (2013.01); *G06F 17/30563* (2013.01)

(58) Field of Classification Search
None
See application file for complete search history.

(56) References Cited

U.S. PATENT DOCUMENTS 5,084,815 A * 1/1992 Mazzario .................. G06F 7/36
5,727,200 A * 3/1998 Narita ....................... G06F 7/24
(Continued)

FOREIGN PATENT DOCUMENTS

CN    102968496 A    3/2013

OTHER PUBLICATIONS

Abali, Bulent, et al., "Balanced Parallel Sort on Hypercube Multiprocessors", IEEE Transactions on Parallel and Distributed Systems, vol. 4, No. 5, May 1993, 10 pages.
(Continued)

*Primary Examiner* — David T. Brooks
(74) *Attorney, Agent, or Firm* — Cantor Colburn LLP

(57) ABSTRACT

A data driven parallel sorting method includes distributing input data records to n partitions one by one in a circular manner. Each partition corresponds to a parallel sorting process with an allocated memory chunk sized to store m data records. The method also includes sorting, in parallel, current data records in respective memory chunks in respective partitions. The method also includes in response to distribution of data records of $\lfloor m/n \rfloor$ rounds, circularly controlling one of the n partitions, and writing data records that have been sorted in the memory chunk of the partition into a mass storage as an ordered data chunk, and emptying the memory chunk. The method also includes in response to all data records being distributed, writing data chunks that have been sorted in respective memory chunks into the mass storage, and performing a merge sort on all ordered data chunks in the mass storage.

20 Claims, 8 Drawing Sheets

(51) Int. Cl.
 *G06F 7/24* (2006.01)
 *G06F 7/36* (2006.01)

(56) References Cited

U.S. PATENT DOCUMENTS

| | | | |
|---|---|---|---|
| 5,845,113 A * | 12/1998 | Swami | G06F 7/24 |
| 5,852,826 A * | 12/1998 | Graunke | G06F 7/36 |
| 6,427,148 B1 * | 7/2002 | Cossock | G06F 7/36 |
| | | | 707/700 |
| 6,757,284 B1 * | 6/2004 | Galles | H04L 49/552 |
| | | | 370/394 |
| 7,293,024 B2 | 11/2007 | Bayliss et al. | |
| 7,536,432 B2 | 5/2009 | Yamamoto | |
| 8,140,585 B2 | 3/2012 | Chen et al. | |
| 2010/0031008 A1 * | 2/2010 | Edahiro | G06F 7/36 |
| | | | 712/220 |
| 2012/0098864 A1 * | 4/2012 | Chowdhry | G09G 5/14 |
| | | | 345/660 |
| 2012/0278586 A1 * | 11/2012 | Caufield | G06F 9/505 |
| | | | 711/173 |
| 2012/0330979 A1 * | 12/2012 | Elson | G06F 17/30988 |
| | | | 707/752 |

OTHER PUBLICATIONS

Hao, Song et al., "A Partition-Merge based Cache-Conscious Parallel Sorting Algorithm for CMP with Shared Cache", 2009 International Conference on Parallel Processing, 2009 IEEE, pp. 396-403.
Young, Honesty C. . et al., The Parameterized Round-Robin Partitioned Algorithm for Parallel External Sort, Parallel Processing Symposium Proceedings, 9th International Date of Conference, Apr. 25-28, 1995, 7 Pages.

* cited by examiner

9,990,412 B2

DATA DRIVEN PARALLEL SORTING SYSTEM AND METHOD

PRIORITY

This application claims priority to China Patent Application No. 201310154333.5, filed Apr. 28, 2013, and all the benefits accruing therefrom under 35 U.S.C. § 119, the contents of which in its entirety are herein incorporated by reference.

BACKGROUND

The present invention relates generally to the field of parallel computation, and more specifically, to a data driven parallel sorting system and method.

A parallel sorting algorithm is an algorithm that improves sorting efficiency using the parallel computation capability of a computer. The parallel sorting is applicable in fields such as database, extraction-transformation-load (ETL), etc. A parallel sorting algorithm typically adopts a divide and conquer approach. That is, a parallel sorting algorithm divides a sequence to be sorted into a certain number of sub-sequences, orders each sub-sequence, and then merges ordered sub-sequences to produce an entirely ordered sequence.

When parallel sorting is used, data is often distributed to multiple partitions. Each partition corresponds to a sorting process which is, for example, a procedure or a thread. For each partition, the sorting process sorts the data that was distributed to the partition. The sorting process of each respective partition is performed in parallel. Then merge sorting is applied to ordered data across all partitions, to complete the sorting of all data. The merge sorting may utilize various contemporaneous merge sorting algorithms, as long as the sort algorithm merges a plurality of ordered sequences into one ordered sequence.

Parallel sorting is often applied in a data warehouse. For example, it may sort input stream data from a plurality of databases residing in a data warehouse. The input stream data is composed of data records, which may be sorted according to a particular field. In such an application, the volume of data can be very large, and it may not be possible to accommodate all the data records in memory at the same time during sorting.

SUMMARY

One aspect of various embodiments disclosed herein provides a data driven parallel sorting method. The method includes distributing input data records to n partitions one by one in a circular manner. Each partition corresponds to one of a plurality of parallel sorting processes and has an allocated memory chunk. The memory chunk is sized to store m data records. The method also includes sorting, in parallel, current data records in respective memory chunks in respective partitions. The method also includes in response to data records of $\lfloor m/n \rfloor$ rounds being distributed, circularly controlling one of said n partitions, and writing data records that have been sorted in the memory chunk of the partition into a mass storage as an ordered data chunk and emptying the memory chunk. The method also includes in response to all data records being distributed, writing data chunks that have been sorted in respective memory chunks into the mass storage, and performing a merge sort on all ordered data chunks in the mass storage.

Another aspect of various embodiments disclosed herein provides a data driven parallel sorting system. The system includes: a data distributing device, an in-partition sorting device, a controlled data dumping device; and a merge sorting device. The data distributing device is configured to circularly distribute input data records to n partitions one by one. Each partition corresponds to one of a plurality of parallel sorting processes, and is allocated a memory chunk used to store distributed data records. The memory chunk is sized to store m data records, where n is an integer larger than 1 and m is a positive integer. The in-partition sorting device is configured to sort current data records in respective memory chunks in parallel in respective partitions. The controlled data dumping device is configured to, in response to data records of $\lfloor m/n \rfloor$ rounds being distributed, circularly control one of said n partitions, write data records that have been sorted in the memory chunk of the partition into a mass storage as an ordered data chunk and empty the memory chunk, wherein $\lfloor m/n \rfloor$ indicates that the quotient of m/n is rounded down to the closest integer. The merge sorting device is configured to, in response to distributing of all data records being completed, write data chunks that have been sorted in respective memory chunks into the mass storage, and apply the merge sorting to all ordered data chunks in the mass storage.

Yet another aspect of various embodiments disclosed herein provides a computer program product for parallel sorting. The computer program product comprises a non-transitory computer readable storage medium having program code embodied therewith. The program code is executable by a processor to perform a method. The method includes distributing input data records to n partitions one by one in a circular manner. Each partition corresponds to one of a plurality of parallel sorting processes and has an allocated memory chunk. The memory chunk is sized to store m data records. The method also includes sorting, in parallel, current data records in respective memory chunks in respective partitions. The method also includes in response to data records of $\lfloor m/n \rfloor$ rounds being distributed, circularly controlling one of said n partitions, and writing data records that have been sorted in the memory chunk of the partition into a mass storage as an ordered data chunk and emptying the memory chunk. The method also includes in response to all data records being distributed, writing data chunks that have been sorted in respective memory chunks into the mass storage, and performing a merge sort on all ordered data chunks in the mass storage.

BRIEF DESCRIPTION OF THE SEVERAL VIEWS OF THE DRAWINGS

Through the more detailed description of exemplary embodiments of the present disclosure with reference to the accompanying drawings, the above and other objects, features, and advantages of the present disclosure will become more apparent, wherein the same reference generally refers to the same components in the exemplary embodiments of the present disclosure.

DETAILED DESCRIPTION

Figure 1:
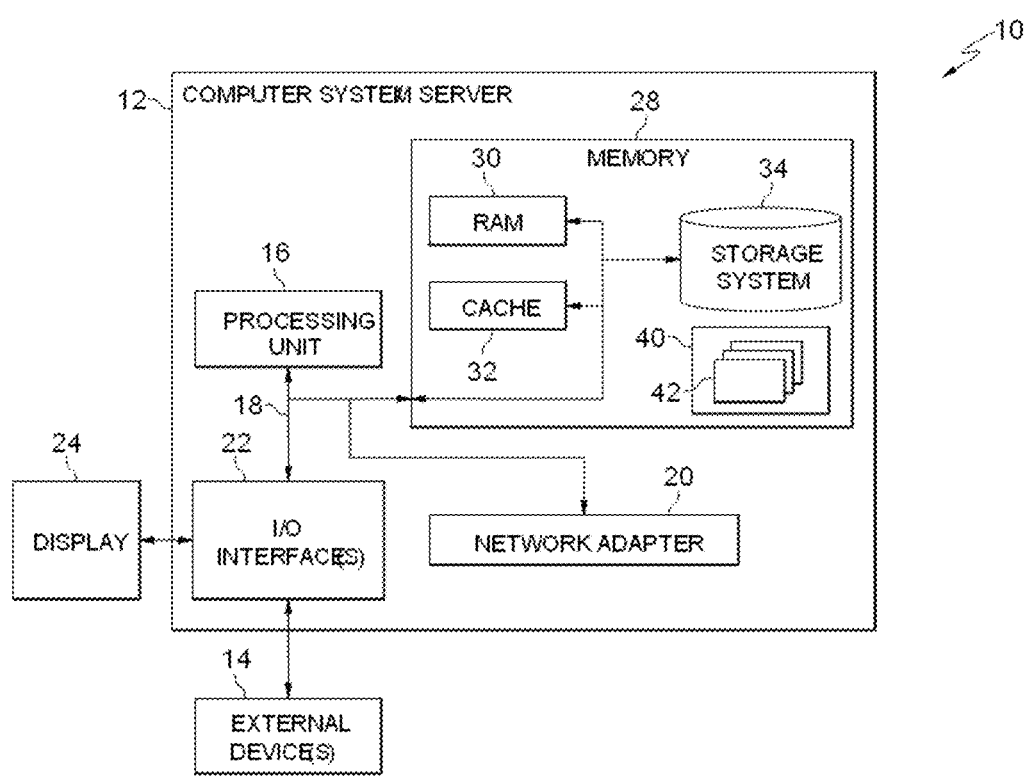
FIG. 1 shows an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, shown is an example computer system/server 12 which is applicable to implement the embodiments disclosed herein. Computer system/server 12 shown in FIG. 1 is only illustrative and is not intended to suggest any limitation as to the scope of use or functionality of embodiments of the invention described herein.

Computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as: a keyboard; a pointing device; a display 24; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
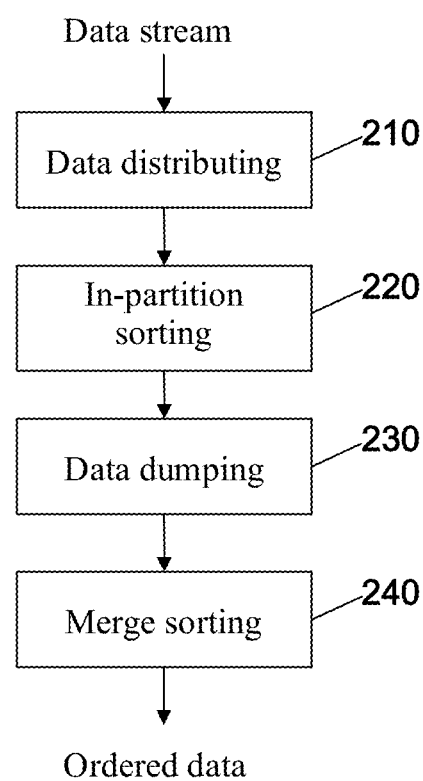
FIG. 2 is a flowchart illustrating a parallel sorting method of the prior art for a large volume of data.

FIG. 2 is a flowchart illustrating a parallel sorting method with a large volume of data. In data distributing step 210, data from a continuous input stream is evenly distributed among a plurality of partitions, each of which is allocated a memory chunk having a particular size. This memory chunk is used to store distributed data for sorting. The distribution of data is performed continuously. Data is distributed as received, unless the process is blocked. The data distributing process is independent of the sorting processes that correspond to respective partitions.

At in-partition sorting step 220, data in each partition's own memory chunk is sorted via the sorting process corresponding to the partition. The sorting processes in respective partitions are performed in parallel. In data dumping step 230, when the memory chunk in a partition reaches full and data in the memory chunk has been sorted, the current ordered data chunk in the memory chunk is temporarily written in a mass storage (e.g., a hard disk), and the memory chunk is emptied. That is, within a particular partition, the same memory chunk (empty at this time) is always used to process subsequent input data, and when sorting is complete, the ordered data chunk is written in the hard disk. For each partition, sorting and dumping are performed in a circular manner, until all data is sorted into ordered data chunks and is written in the hard disk.

In merge sorting step 240, in response to completing the distribution of all data records, ordered data chunks in respective memory chunks are written in the hard disk, and the merge sorting is applied to all ordered data chunks in the hard disk. Through use of a simple merge sorting algorithm, merge sorting is performed on all such ordered data chunks (on the hard disk) of all partitions. In this manner, ordered data chunks are merged, and data therein is kept ordered. Thus, a final ordered sequence is obtained. This is the parallel sorting method widely used for a large volume of data, with respective partitions performing steps 220 and 230 in parallel. However, this technique leads to CPU utilization fluctuating wildly and lower throughput, since sorting processes in respective partitions compete for CPU resources almost at the same time.

Figure 3:
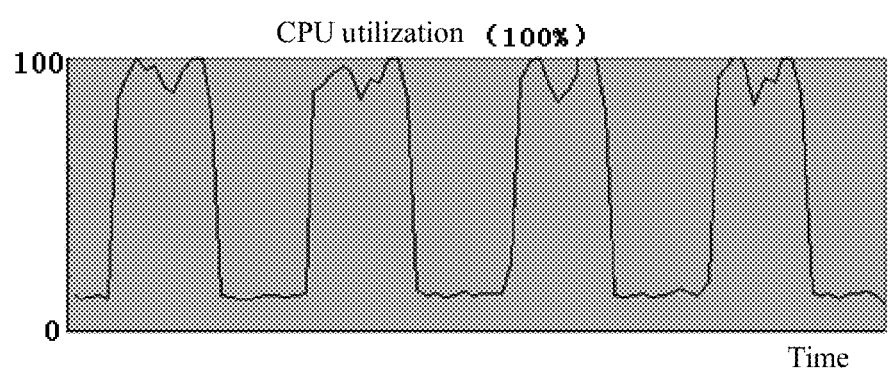
FIG. 3 is a schematic diagram illustrating CPU utilization when a parallel sorting method of the prior art is used.

FIG. 3 is a schematic diagram illustrating CPU utilization when such a contemporaneous parallel sorting method is used. It can be seen from FIG. 3 that, the fluctuation of the utilization of CPU is large, and the utilization of CPU is close to, or even reaches 100% at peaks, which leads to reduced processing efficiency. However, the utilization of CPU is less than 20% at valleys, which leads to waste of processing power.

The root cause of this phenomenon is that a data distributer distributes data to respective partitions evenly using a round robin method. In a round of distributing, one data record is distributed to each partition. Each partition receives the input data distributed to it. Since a round of distributing may be completed in a very short time (almost at the same time), sorting processes in respective partitions process newly input data records almost simultaneously, and respective partitions also need to write an ordered data chunk in the hard disk almost simultaneously. That is, when respective partitions sort all data records in memory chunks based on input of data records newly distributed to them, respective partitions will compete for CPU resources at the same time. This competition leads to occurrences of peaks in FIG. 3.

Additionally, for the above reason, when sorting within respective partitions is completed, respective partitions will also compete for input/output (IO) resources in order to write ordered data chunks in the hard disk. This competition leads to waiting and delay, reducing efficiency of usage of system resources.

Usually, when the size of a memory chunk is small, it is less obvious to reduce efficiency of how the system uses parallel sorting. Reduction of the size of a memory chunk may mitigate the above problem, but this approach has other drawbacks. When the volume of data is very large, small memory chunks are not helpful, because this will cause excessive data chunks to be generated on the hard disk so that merging all these data chunks by the merge sorting process becomes very slow. This in turn causes the whole sorting process to be very slow. Thus, reduction of the size of the memory chunk may not solve the above problem. Various embodiments of data driven parallel sorting systems and methods disclosed herein optimize utilization of system resources, for example, CPU resources and I/O resources. According to one aspect, embodiments disclosed herein control partitions so that the respective partitions write data chunks that have been sorted, in their own memory chunks, into a mass storage at calculated times, even the memory chunks are not full. This creates a time difference between writing data memory chunks of different partitions into the hard disk and between of intense CPU computation. This time difference, which can be large, avoids respective partitions' intensive competition for various system resources. Therefore, system resource utilization can be optimized to improve the performance of parallel sorting.

In the parallel sorting method of the contemporaneous method of FIG. 3, as soon as a data record is distributed to a partition, the partition re-sorts the data record and other data records (if any) that have been sorted in the memory chunk of the partition. Once the memory chunk of a partition becomes full, data chunk in the memory chunk is written in the hard disk. Thus, the parallel sorting method of FIG. 3 is a data driven method.

Recognized herein are two factors for reducing of system resource utilization. One is the occurrence of peaks, representing the respective partitions' use of CPU resources, occurring at almost the same time. Such a peak appears at the time when the volume of data in the memory chunk exceeds a certain threshold to the memory chunk becomes full. This is the case because the more data in the memory chunk, the more number of comparisons necessary for the sorting process, thus increasing the use of CPU resources. The second factor is that distributing data in round robin method leads memory chunks in respective partitions to become full at almost the same time. The method operates to write data chunks in memory chunks into the hard disk almost at the same time, which causes intensive competition for I/O resources. Based on these observations, the present disclosure recognizes that it is introducing a time difference between timings of writing data chunks in memory chunks of different partitions into the hard disk solves the technical problems discussed above.

Figure 4:
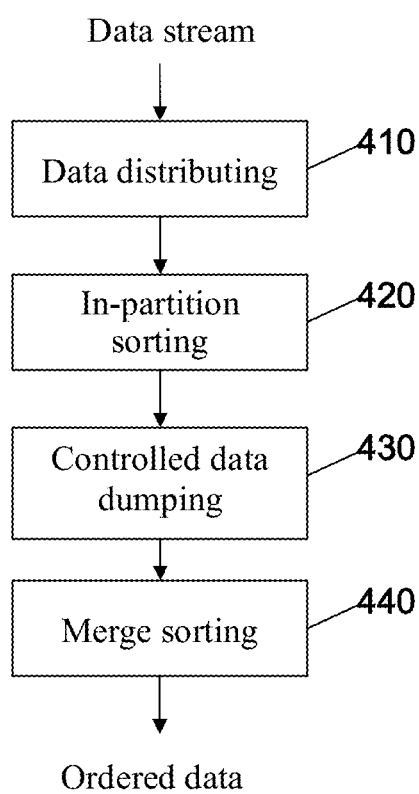
FIG. 4 is a flowchart illustrating a data driven parallel sorting method according to one embodiment of the present invention.

Referring now to FIG. 4, shown is a flowchart illustrating a data driven parallel sorting method according to one embodiment disclosed herein. This method may, for example, be applied to data acquisition in a data warehouse. In such an application, the input data record is streaming data, i.e., a stream of data records. The process in the flowchart in FIG. 4 includes the following steps: a data distributing step 410, an in-partition sorting step 420, a controlled data dumping step 430, and a merge sorting step 440. Each step in the data driven parallel sorting method of the present invention in FIG. 4 will now be described in further detail.

In the data distributing step 410, a round robin method is used to distribute input data records to n partitions one by one, in a circular manner. Here, n is an integer larger than 1. Each partition corresponds to one of a plurality of parallel sorting processes, and each partition is allocated a memory chunk used to store distributed data records. The memory chunk is able to store m data records, where m is a positive integer. In some embodiments applied to data acquisition, m may reach an order of magnitude of millions.

Here, the round robin method means circularly distributing incoming data records to n partitions one by one, in turn. For example, the 1st data record to the nth data records are distributed, in order of arrival, to the 1st to the nth partitions respectively. Subsequently, the (n+1)th to the 2 nth data records (in order of arrival) are circularly distributed to the 1st to the nth partitions respectively, and so on.

The sorting process may be implemented, for example, as a procedure or a thread. These sorting processes, the number of which is the same as the number (i.e., n) of partitions, can be performed in parallel. In one embodiment, at least two of sorting processes corresponding to respective partitions compete for the same processor resources. Such a parallel sorting method can reduce competition for CPU resources. In another embodiment, sorting processes corresponding to respective partitions are distributed to different processors, or processor cores, so that there is no competition for CPU. However, in this case, the parallel sorting method disclosed herein can still effectively reduce competition for I/O resources, as described later.

The distribution of data is performed continuously. Data is distributed when it arrives, unless the process is blocked. The data distributing is independent of the sorting processes that correspond to respective partitions.

Figure 5:
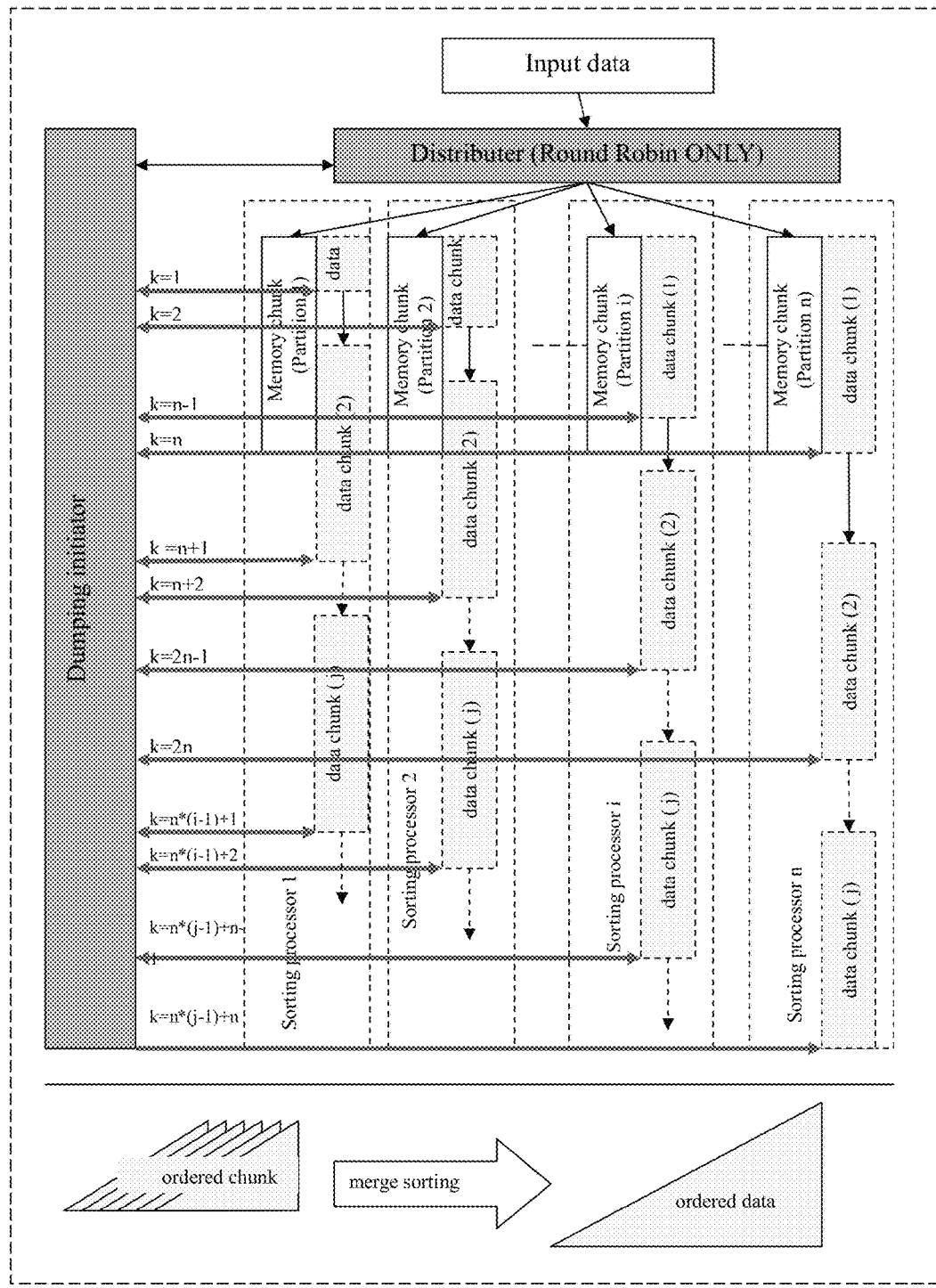
FIG. 5 is a schematic diagram illustrating the principle reflecting the data driven parallel sorting method according to one embodiment of the present invention.

FIG. 5 is a schematic diagram illustrating the principle of the data driven parallel sorting method, according to one embodiment disclosed herein. FIG. 5 only gives an example embodiment of the data driven parallel sorting method, and this example is provide for ease of understanding the principle of the present invention. This example should not be construed to limit the scope of the embodiments described herein.

In FIG. 5, n partitions are provided, and each partition is allocated with a memory chunk of a particular size. Each partition also has a respective sorting processor, implemented on a process or a thread. In FIG. 5, only the 1st, 2nd, i-th, and n-th partitions are shown, with the remaining partitions are represented by transverse broken lines between partitions. Of course, the techniques described herein are applicable to cases with other numbers of partitions, such as 2 or 3 partitions.

The distributer in FIG. 5 is a separate process or thread that is dedicated to distributing incoming data to the n partitions. The distributer may transmit a signal to the sorting processors and/or the dumping initiator shown in FIG. 5. According to the operation in step 410 (FIG. 4), the distributer in FIG. 5 distributes incoming data records to respective partitions one by one in the round robin method, and stores in corresponding memory chunks.

In the in-partition sorting step 420 (FIG. 4), current data records in respective memory chunks are sorted in parallel, in respective partitions. The sorting may employ various known sorting algorithms, e.g., bubble sorting, quick sorting, binary sorting, etc. As shown in FIG. 5, sorting processors 1-n sort input data records in memory chunks in respective partitions. In FIG. 5, only sorting processors 1, 2, i, and n are exemplified, and other sorting processors are omitted.

As noted above, since data distributing may be completed in a very short time, respective partitions need much longer time to perform in-partition sorting, as compared with data distributing. Since in-partition sorting of respective partitions is performed almost at the same time, the problem of excessive competition for system resources arises. The techniques disclosed herein improve on the data dumping step of contemporaneous methods, as follows.

In the controlled data dumping step 430, in response to data records of $\lfloor m/n \rfloor$ rounds being distributed, one of the n partitions is circularly controlled. That is, ordered data records in the memory chunk of the partition are written into a mass storage as an ordered data chunk, and the memory chunk is emptied. The term $\lfloor m/n \rfloor$ indicates that the quotient of m/n is rounded down to the closest integer. Here, data dumping means writing data chunks (that have been sorted) in the memory chunk into the mass storage and emptying the memory chunk. The mass storage may be implemented, for example, as a magnetic hard disk or a solid state hard disk. In a round of distributing, one data record is distributed to each partition. Since one of the n partitions is controlled to perform data dumping whenever data records of $\lfloor m/n \rfloor$ rounds are distributed, as for the n partitions, sizes of the ordered data chunks that are written into the mass storage for the first time are not equal. Thus, there is a time difference as to when respective partitions compete for system resources.

For example, as can be seen in FIG. 5, data chunks 1, 2, ..., j, ... are shown in each partition. These data chunks are ordered data chunks dumped into (for example) a hard disk from the memory chunk, after in-partition sorting. Because of control mechanism described herein, sizes of the first dumped data chunks in respective partitions are not equal, but data chunks starting from the second one in respective partitions are equal in size (m data records). Additionally, it is noted that, the last data chunks (not shown) in respective partitions might be not equal in size either, because a scenario where all memory chunks are filled in the last loop usually does not occur. It also holds true for the contemporaneous parallel sorting process in FIG. 2.

In one embodiment, suppose that i is the number of a partition, $1 \leq i \leq n$. As for the 1st to the (n−1)th partitions, sizes of the ordered data chunks that are written into the mass storage for the first time are less than m data records, for example, as shown by data chunks 1 in the 1st, 2nd, i-th partitions in FIG. 5. (Although FIG. 5 only shows the details of four partitions (1, 2, i, n), sizes of data chunks 1 in the 1st to the (n−1)th partitions are all less than m). Additionally, as for the n-th partition, the size of the ordered data chunk that is written into the mass storage for the first time is less than or equal to m data records. That is, when m/n is divisible, the size of the data chunk 1 in the n-th partition is m data records; and when m/n is not divisible, the size of the data chunk 1 in the nth partition is less than m data records.

In one embodiment, suppose that i is the number of a partition, $1 \leq i \leq n$, and in response to data records of $\lfloor m/n \rfloor$ rounds being distributed, the circular control of one of the n partitions includes: in response to data records of $\lfloor m/n \rfloor$*kth rounds being distributed, controlling the ith (i=(k mod n)) partition to write ordered data records in the memory chunk of the partition into the mass storage as an ordered data chunk, wherein k is a positive integer, and (k mod n) indicates the remainder after k modulo n. Here, k may be regarded as a counter, which is initialized to zero (it is noted that the initialized value is meaningless). Whenever data records of $\lfloor m/n \rfloor$ rounds are distributed, the value of the counter is increased by 1. The remainder obtained after the value of the counter modulo n is the number of the partition to be controlled.

In one embodiment, the above counter may be implemented by the dumping initiator shown in FIG. 5. In this case, whenever data records of $\lfloor m/n \rfloor$ rounds are distributed, the distributer transmits a signal to the dumping initiator in FIG. 5. In response to the signal, the dumping initiator causes the counter to be increased by 1, and initiates data dumping in the corresponding partition i according to i=(k mod n) calculated in accordance with the value of the counter (see transverse double arrows between the dumping initiator and respective partitions in FIG. 5). Specifically, in one embodiment, the dumping initiator may start a write process or thread with respect to the partition, write a snapshot of data chunk that has been sorted in the memory chunk of the partition (into a hard disk, for example), and empty the memory chunk. In another embodiment, the dumping initiator does not necessarily start a special write process or thread, but may notify a corresponding sorting processor, so that the sorting processor, in response to the notification, itself invokes a write instruction to finish data dumping.

In one embodiment, the above counter may be implemented in the distributer shown in FIG. 5. In this case, whenever data records of $\lfloor m/n \rfloor$ rounds are distributed, the distributer causes the counter to be increased by 1, and transmits a signal to the corresponding sorting processor i according to i=(k mod n) calculated in accordance with the value of the counter. In response to receiving the signal directly from the distributer, the corresponding sorting processor starts a special write process or thread or invokes a write instruction to finish data dumping.

In the case of introducing the above value k, when k is less than or equal to n, sizes of the ordered data chunks that are written into the mass storage are $\lfloor m/n \rfloor$*k data records. On the other hand, when k is larger than n and input data records are enough (i.e., neither the first data chunk nor the last data chunk), sizes of the ordered data chunks that are written into the mass storage are m data records.

As described above, various methods may be employed to implement the inventive concept of embodiments disclosed herein, and such embodiments are not limited to the particular structure shown in FIG. 5.

In the following, a simple example is given to illustrate the parallel sorting of the present invention in detail. Suppose that n=4 (i.e., there are 4 partitions) and m=16 (i.e., the memory chunk in each partition can store 16 data records). It is noted that this is only a simple example given for ease of understanding. In reality, the number of partitions may be more than 64, and a memory chunk may be large enough to store millions of data records. In the case of n=4 and m=16, $\lfloor m/n \rfloor$=4. That is, whenever data records of 4 rounds (16 data records) are distributed, one of the 4 partitions is controlled in a circular manner, data records that have been sorted in the memory chunk of the partition are written into the mass storage as an ordered data chunk, and the memory chunk is emptied.

Referring to the example in FIG. 5, when k=1 (i.e., data records of 4 rounds are distributed), data dumping is performed on the partition 1 ((k mod 4)=1). At this time, there are only 4 data records that have been sorted in the memory chunk of the partition 1 (i.e., ¼ full). In this way, the data chunk 1 of a size of m*¼ in the partition 1 is written into storage (a hard disk, for example) and the memory chunk of the partition 1 is emptied.

When k=2 (i.e., data records of 8 rounds are distributed), data dumping is performed on the partition 2 ((k mod 4)=2). At this time, there are only 8 data records that have been sorted in the memory chunk of the partition 2 (i.e., half full).

In this way, the data chunk 1 of a size of m*½ in the partition 2 is written into storage (the hard disk, for example) and the memory chunk of the partition 2 is emptied.

When k=3 (i.e., data records of 12 rounds are distributed), data dumping is performed on the partition 3 ((k mod 4)=3). At this time, there are only 12 data records that have been sorted in the memory chunk of the partition 3 (i.e., ¾ full). In this way, the data chunk 1 of a size of m*¾ in the partition 3 is written into storage (the hard disk, for example) and the memory chunk of the partition 3 is emptied.

When k=4 (i.e., data records of 16 rounds are distributed), data dumping is performed on the partition 4 ((k mod 4)=4). At this time, there are 16 data records that have been sorted in the memory chunk of the partition 4 (i.e., full). In this way, the data chunk 1 of a size of m in the partition 4 is written into the storage (the hard disk, for example) and the memory chunk of the partition 4 is emptied.

When k=5 (i.e., data records of 20 rounds are distributed), data dumping is again performed on the partition 1 ((k mod 4)=1). At this time, there are 16 data records that have been sorted in the memory chunk of the partition 1 (at this time, 16 rounds have passed after the memory chunk of the partition 1 is emptied after data distributing of the 4th round). In this way, the data chunk 1 of a size of m in the partition 1 is written into the storage (the hard disk, for example) and the memory chunk of the partition 1 is emptied.

The controlled data dumping step 430 is performed as described above, and the subsequent steps are performed in a similar way. It is noted that longitudinal arrows in FIG. 5 represent a sequential relationship between data chunks, the solid line arrows represent being adjacent, and broken line arrows represent there are other omitted data chunks between data chunks.

Referring back to FIG. 4, the merge sorting step 440 is similar to the merge sorting step 240 in FIG. 2. In response to distribution of all data records being completed, data records that have been sorted in respective memory chunks are written into the mass storage, and the merge sorting is applied to all ordered data chunks in the mass storage. Using a merge sorting algorithm, merge sorting is performed on all such ordered data chunks (on the hard disk) of all partitions, thus merging these ordered data chunks and keeping data therein ordered. A final ordered sequence is therefore obtained. (See the lower part in FIG. 5.)

In one embodiment, in response to receiving a signal indicating completion of data distribution from the distributer, the dumping initiator starts a write process or thread to write data chunks (that have been sorted) in respective memory chunks into storage (a hard disk, for example). In another embodiment, the distributer directly notifies respective sorting processors of completion of data distributing, so that respective sorting processors respectively start a write process or thread or invoke a write instruction to write data chunks into storage (a hard disk, for example).

In another embodiment, upon receiving a signal indicating completion of data distributing, dumping is not performed on current data chunks (i.e., the last data chunks) in memory chunks of respective partitions. Instead, merge sorting of all ordered data chunks (including data chunks in the hard disk and data chunks in memory chunks) is directly started. By doing so, it is possible to avoid the redundant I/O operation, i.e., a requirement to read back the last data chunks after they are written to the hard disk.

By controlling respective partitions to cause them to write data chunks that have been sorted in their own memory chunks into a mass storage at calculated times (even the memory chunks are not full), embodiments described herein produce a difference between the time that data in memory chunks of different partitions are written to the hard disk, and times when CPU computation intensity is large. This difference avoids intense competition for various system resources between respective partitions. Therefore, utilization of system resources can be optimized to improve the performance of parallel sorting.

Figure 6:
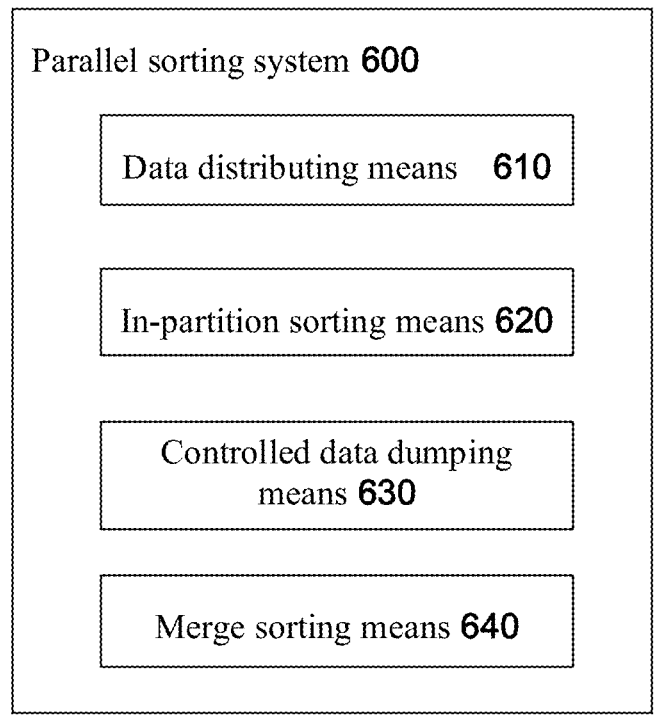
FIG. 6 is a block diagram illustrating a data driven parallel sorting system according to one embodiment of the present invention.

FIG. 6 is a block diagram illustrating a data driven parallel sorting system according to an embodiment disclosed herein. The parallel sorting system 600 in FIG. 6 includes a data distributing means 610, an in-partition sorting means 620, a controlled data dumping means 630, and a merge sorting means 640. The data distributing means 610 is configured to circularly distribute input data records to n partitions one by one. Each partition corresponds to one of a plurality of parallel sorting processes, and each partition is allocated a memory chunk used to store distributed data records. The memory chunk is able to store m data records, where n is an integer larger than 1 and m is a positive integer.

The in-partition sorting means 620 is configured to sort current data records in respective memory chunks in parallel in respective partitions. The controlled data dumping means 630 is configured to, in response to data records of $\lfloor m/n \rfloor$ rounds being distributed, circularly control one of said n partitions, write data records that have been sorted in the memory chunk of the partition into a mass storage as an ordered data chunk and empty the memory chunk. The term $\lfloor m/n \rfloor$ represents the quotient of m/n rounded down to the closest integer. The merge sorting means 640 is configured to, in response to distributing of all data records being completed, write data chunks that have been sorted in respective memory chunks into the mass storage, and to apply the merge sorting to all ordered data chunks in the mass storage.

Figure 7:
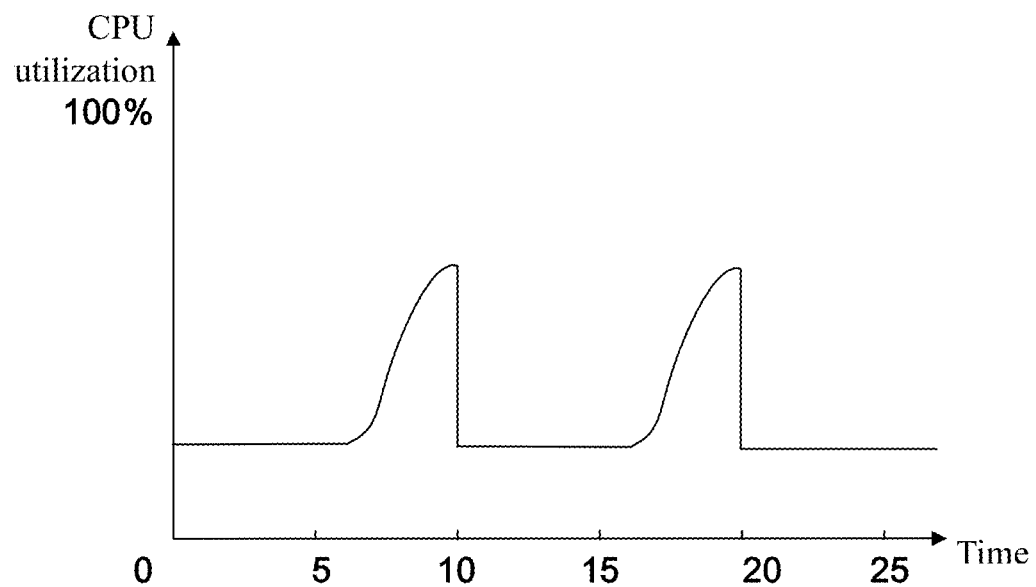
FIG. 7 is a diagram illustrating CPU utilization during a contemporaneous parallel sorting method.
Figure 7:
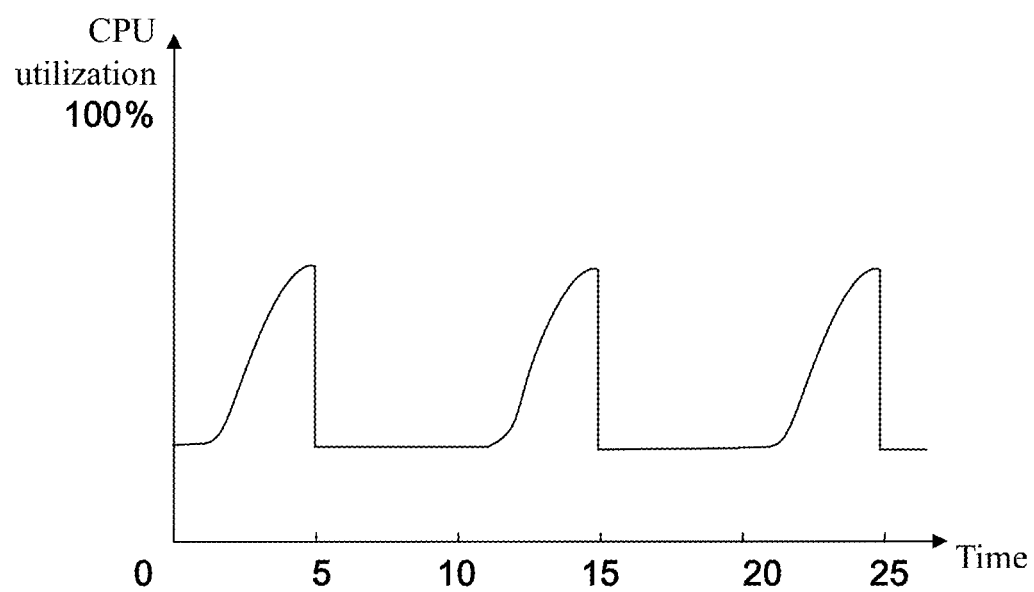
Figure 8:
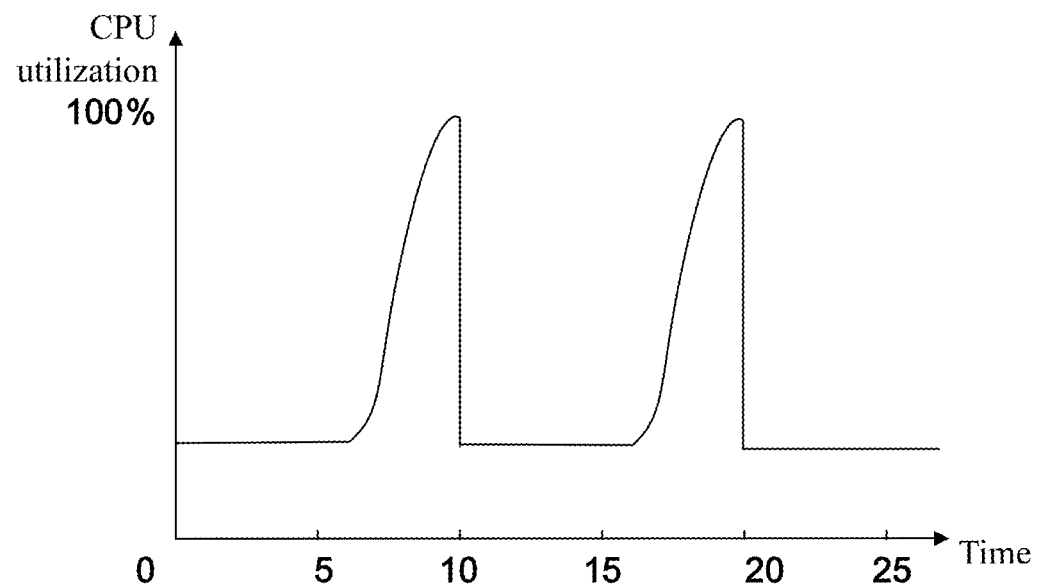
FIG. 8 is a diagram illustrating a reduced CPU competition during a parallel sorting method according to an embodiment disclosed herein.
Figure 8:
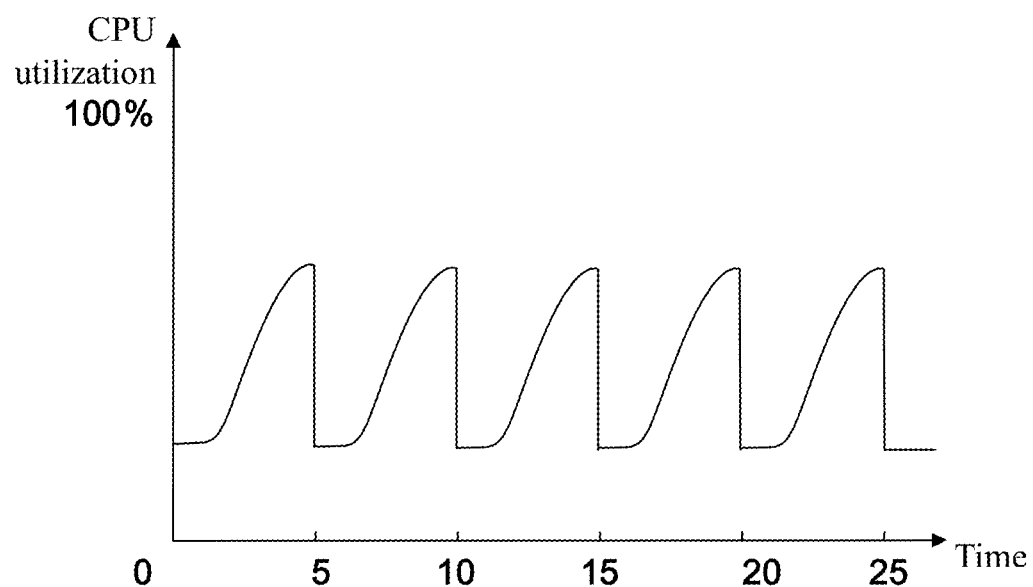

FIG. 7 is a diagram illustrating CPU utilization during a contemporaneous parallel sorting method. FIG. 8 is a diagram illustrating a reduced CPU competition during a parallel sorting method according to an embodiment disclosed herein. The upper part in FIG. 7 shows CPU utilization by a partition sorting process. In the contemporaneous method, when there are two partitions, CPU utilizations by sorting processes in the two partitions are similar, as shown in the upper part in FIG. 7. Thus, CPU utilizations by sorting processes in the two partitions lead to the overlap shown in the upper part in FIG. 8, i.e., peaks overlap with peaks, and valleys overlap with valleys. In contrast, in various parallel sorting methods disclosed herein, when there are two partitions, a difference is generated between time periods in which CPU utilization by the two partitions are high. For example, CPU utilization by the partition 1 sorting process is shown in the upper part in FIG. 7, while CPU utilization the partition 2 sorting process is shown in the lower part in FIG. 7.

FIG. 8 shows overlapping CPU utilizations by sorting processes in the two partitions during parallel sorting according to the inventive techniques disclosed herein. As seen in the drawing, in comparison with the upper part in FIG. 8, there is no case where utilization is close to 100%, thereby achieving the effect of flattening. Therefore, the response speed of CPU is improved and CPU utilization is optimized.

Competition for I/O resources is handled in a manner similar to that discussed for FIGS. 7 and 8. When the writing processes of ordered data chunks from respective partitions compete for the same I/O resource, intensive competition for the I/O resource is also avoided because of the time difference produced by the techniques disclosed herein, thereby optimizing utilization of the I/O resources. In addition, even in the case of multiple processors (e.g., 4 processors), if the number of partitions exceeds the number of processors, a case where sorting processes in multiple partitions compete for the same processor resource still exists. In this case, the techniques disclosed herein may still be applicable to avoid intensive competition for the processor. In addition, even if the number of partitions is less than the number of processors, CPU resources are nonetheless occupied (for example, other programs are running in the system), so it is still possible for the system to schedule sorting processes in multiple partitions to compete for the same processor resource. In this case, the techniques disclosed herein may still be applicable to reduce intensive competition for the processor.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A data driven parallel sorting method utilizing a plurality of parallel sorting processes, the method comprising:
    distributing input data records to n partitions one by one in a circular manner, each partition corresponding to one of the parallel sorting processes and having an allocated memory chunk, said memory chunk sized to store m data records where n is an integer larger than 1 and m is a positive integer;
    sorting, in parallel, current data records in respective memory chunks in respective partitions;
    in response to data records of $\lfloor m/n \rfloor$ rounds being distributed, circularly controlling one of said n partitions, and writing, at a calculated time, data records that have been sorted in the memory chunk of the one of said n partitions into a mass storage as an ordered data chunk even when the memory chunk is not full and emptying the memory chunk, wherein the calculated time produces a time difference based on when data is written to mass storage and computation intensity of one or more processors handling at least one of the plurality of parallel sorting processes; and
    in response to all data records being distributed, writing data chunks that have been sorted in respective memory chunks into the mass storage, and performing a merge sort on all ordered data chunks in the mass storage.

2. The method according to claim 1, wherein the input data records correspond to streaming data.

3. The method according to claim 1, wherein the circularly controlling one of said n partitions comprises:
    in response to data records of $\lfloor m/n \rfloor$*k-th round being distributed, controlling the i=(k mod n)th partition, writing data records that have been sorted in the memory chunk of the partition into the mass storage as an ordered data chunk,
    where i is the number of partitions, 1≤i≤n, and k is a positive integer.

4. The method according to claim 3, wherein for the 1st to the (n−1)th partitions, sizes of the ordered data chunks that are written into the mass storage for the first time are less than m data records; and
    for the nth partition, the size of the ordered data chunk that is written into the mass storage for the first time is less than or equal to m data records.

5. The method according to claim 3, wherein when k is less than or equal to n, sizes of the ordered data chunks that are written into the mass storage are $\lfloor m/n \rfloor$*k data records.

6. The method according to claim 3, wherein when k is larger than n, sizes of the ordered data chunks that are written into the mass storage are m data records.

7. The method according to claim 1, further comprising not writing last data chunks in respective partitions into the mass storage.

8. The method according to claim 1, wherein at least two of the sorting processes compete for resources from the same processor of the one or more processors.

9. The method according to claim 1, wherein the writing of ordered data chunks from respective partitions competes for a same I/O resource.

10. The method according to claim 1, wherein the time difference is on sizes of the ordered data chunks written into the mass storage for the first time being of unequal size.

11. A data driven parallel sorting system utilizing a plurality of parallel sorting processes, the system comprising:
    one or more processors in communication with one or more types of memory, the one or more processors configured to:
    facilitate execution of a data distributor configured to circularly distribute input data records to n partitions one by one, each partition corresponding to one of the parallel sorting processes and having an allocated memory chunk, said memory chunk sized to store m data records, where n is an integer larger than 1 and m is a positive integer;
    facilitate execution of an in-partition sorter configured to sort current data records in respective memory chunks in parallel in respective partitions;
    facilitate execution of a controlled data dumper configured to, in response to data records of $\lfloor m/n \rfloor$ rounds being distributed, circularly control one of said n partitions, write, at a calculated time, data records that have been sorted in the memory chunk of the one of said n partitions into a mass storage as an ordered data chunk even when the memory chunk is not full and empty the memory chunk, wherein the calculated time produces a time difference based on when data is written to mass storage and computation intensity of the one or more processors handling at least one of the plurality of parallel sorting processes; and facilitate execution of a merge sorter configured to, in response to distributing of all data records being completed, write data chunks that have been sorted in respective memory chunks into the mass storage, and to apply a merge sorting to all ordered data chunks in the mass storage.

12. The system according to claim 11, wherein the one or more processors are further configured to facilitate the execution of the controlled data dumper to:

in response to data records of $\lfloor m/n \rfloor$*k-th round being distributed, control the i=(k mod n)th partition, writing data records that have been sorted in the memory chunk of the partition into the mass storage as an ordered data chunk, where i is the number of partitions, $1 \leq i \leq n$, and k is a positive integer.

13. The system according to claim 12, wherein for the 1st to the (n−1)th partitions, sizes of the ordered data chunks that are written into the mass storage for the first time are less than m data records; and for the nth partition, the size of the ordered data chunk that is written into the mass storage for the first time is less than or equal to m data records.

14. The system according to claim 12, wherein when k is less than or equal to n, sizes of the ordered data chunks that are written into the mass storage are $\lfloor m/n \rfloor$*k data records.

15. The system according to claim 12, when k is larger than n, sizes of the ordered data chunks that are written into the mass storage are m data records.

16. The system according to claim 11, wherein the last data chunks in respective partitions are not written into the mass storage.

17. The system according to claim 11, wherein at least two of sorting processes corresponding to respective partitions compete for resources from the same processor of the one or more processors.

18. The system according to claim 11, wherein the time difference is on sizes of the ordered data chunks written into the mass storage for the first time being of unequal size.

19. A computer program product for parallel sorting, the computer program product comprising a non-transitory computer readable storage medium having program code embodied therewith, the program code executable by one or more processors to perform a method, the method comprising:

circularly distribute input data records to n partitions one by one, each partition corresponding to one of a plurality of parallel sorting processes and having an allocated memory chunk, said memory chunk sized to store m data records where n is an integer larger than 1 and m is a positive integer;

sorting, in parallel, current data records in respective memory chunks in respective partitions;

in response to data records of $\lfloor m/n \rfloor$ rounds being distributed, circularly controlling one of said n partitions, and writing, at a calculated time, data records that have been sorted in the memory chunk of the one of said n partitions into a mass storage as an ordered data chunk even when the memory chunk is not full and emptying the memory chunk, wherein the calculated time produces a time difference based on when data is written to mass storage and computation intensity of the one or more processors handling at least one of the plurality of parallel sorting processes; and in response to all data records being distributed, writing data chunks that have been sorted in respective memory chunks into the mass storage, and performing a merge sort on all ordered data chunks in the mass storage.

20. The computer program product according to claim 19, wherein the time difference is on sizes of the ordered data chunks written into the mass storage for the first time being of unequal size.

* * * * *